(12) United States Patent
Fischer et al.

(10) Patent No.: US 10,664,737 B2
(45) Date of Patent: May 26, 2020

(54) VALUE OR SECURITY DOCUMENT FROM A FIBRE COMPOSITE MATERIAL AND METHOD FOR PRODUCING THE VALUE OR SECURITY DOCUMENT

(71) Applicant: BUNDESDRUCKEREI GMBH, Berlin (DE)

(72) Inventors: Jörg Fischer, Berlin (DE); Stefan Trölenberg, Ragow (DE); Markus Tietke, Berlin (DE); Frank Fritze, Berlin (DE); Jakob Hille, Berlin (DE); Micha Kraus, Berlin (DE)

(73) Assignee: BUNDESDRUCKEREI GmbH, Berlin (DE)

( * ) Notice: Subject to any disclaimer, the term of this patent is extended or adjusted under 35 U.S.C. 154(b) by 0 days.

(21) Appl. No.: 15/775,833

(22) PCT Filed: Nov. 11, 2016

(86) PCT No.: PCT/EP2016/077459
§ 371 (c)(1),
(2) Date: May 13, 2018

(87) PCT Pub. No.: WO2017/081268
PCT Pub. Date: May 18, 2017

(65) Prior Publication Data
US 2018/0330221 A1 Nov. 15, 2018

(30) Foreign Application Priority Data

Nov. 12, 2015 (DE) .......................... 10 2015 222 364

(51) Int. Cl.
*G06K 19/07* (2006.01)
*G06K 19/077* (2006.01)
(Continued)

(52) U.S. Cl.
CPC .......... *G06K 19/07722* (2013.01); *B32B 3/08* (2013.01); *B32B 3/266* (2013.01);
(Continued)

(58) Field of Classification Search
CPC .. G06K 19/07722; B42D 25/00; B42D 25/22; B42D 25/305
(Continued)

(56) References Cited

U.S. PATENT DOCUMENTS 4,110,364 A 8/1978 Gaku et al.
8,090,945 B2 * 1/2012 Singhal .................. G06F 21/32
713/168
(Continued)

FOREIGN PATENT DOCUMENTS

DE 2512085 B2 3/1975
DE 19627543 A1 11/1997
(Continued)

*Primary Examiner* — Daniel A Hess
(74) *Attorney, Agent, or Firm* — Bonini IP Law, LLC; Frank J. Bonini, Jr.

(57) ABSTRACT

The mechanically stable value or security document 2000 according to the invention comprising an electric circuit 1270 is characterised by the following features: the document is formed of at least three document layers which are arranged in a stack 1700 and which are connected together face-to-face by a joining method, wherein a first document layer is formed by a circuit carrier layer 1200 which supports the electric circuit 1270, at least one second document layer is formed in each case by a compensation layer 1100 which has at least one opening 1120 and/or recess, and at least one third document layer is formed in each case by an outer cover layer 1300. The first 1200, the at least one second 1100, and the at least one third document layer 1300 are formed from a fibre composite material.

21 Claims, 7 Drawing Sheets

(51) Int. Cl.

| | | |
|---|---|---|
| *G07F 7/08* | (2006.01) | |
| *B32B 3/08* | (2006.01) | |
| *B32B 5/26* | (2006.01) | |
| *B32B 5/22* | (2006.01) | |
| *B32B 3/26* | (2006.01) | |
| *B42D 25/45* | (2014.01) | |
| *B42D 25/305* | (2014.01) | |
| *B42D 25/22* | (2014.01) | |
| *B42D 25/00* | (2014.01) | |
| *B42D 25/475* | (2014.01) | |
| *G06K 19/02* | (2006.01) | |
| *G06F 21/32* | (2013.01) | |

(52) U.S. Cl.
CPC ............... *B32B 5/22* (2013.01); *B32B 5/26* (2013.01); *B42D 25/00* (2014.10); *B42D 25/22* (2014.10); *B42D 25/305* (2014.10); *B42D 25/45* (2014.10); *B42D 25/475* (2014.10); *G06K 19/02* (2013.01); *G07F 7/082* (2013.01); *G07F 7/0806* (2013.01); *G07F 7/0813* (2013.01); *G07F 7/0826* (2013.01); *B32B 2250/03* (2013.01); *B32B 2250/40* (2013.01); *B32B 2260/046* (2013.01); *B32B 2307/20* (2013.01); *B32B 2425/00* (2013.01); *B32B 2457/20* (2013.01); *B32B 2519/02* (2013.01); *G06F 21/32* (2013.01); *G06K 19/077* (2013.01)

(58) Field of Classification Search
USPC ........................................ 235/487, 488, 492
See application file for complete search history.

(56) References Cited

U.S. PATENT DOCUMENTS

| | | | |
|---|---|---|---|
| 8,862,885 B2 | 10/2014 | Hamann et al. | |
| 2001/0011685 A1* | 8/2001 | Fries ................ | G06K 19/07783 235/492 |
| 2006/0047971 A1* | 3/2006 | Miyazaki ............. | G06K 9/0002 713/186 |
| 2011/0108629 A1* | 5/2011 | Mueller-Hipper ......................... | G06K 19/07747 235/488 |
| 2013/0082112 A1* | 4/2013 | Pueschner ........ | G06K 19/07747 235/488 |
| 2014/0174645 A1 | 6/2014 | Segura et al. | |
| 2015/0028107 A1* | 1/2015 | Fischer ............ | G06K 19/07783 235/488 |
| 2016/0004947 A1 | 1/2016 | Pueschner et al. | |
| 2018/0003987 A1 | 1/2018 | Otsubo et al. | |
| 2018/0039874 A1 | 2/2018 | Fischer et al. | |

FOREIGN PATENT DOCUMENTS

| | | |
|---|---|---|
| DE | 102009045544 A1 | 5/2011 |
| DE | 102009060862 A1 | 7/2011 |
| DE | 102011108531 A1 | 1/2013 |
| DE | 102012223472 A1 | 6/2014 |
| DE | 102013102003 A1 | 8/2014 |
| DE | 102014204552 A1 | 9/2015 |
| DE | 102014005553 A1 | 10/2015 |
| DE | 102014110694 A1 | 2/2016 |
| DE | 102015204018 A1 | 8/2016 |
| KR | 101012242 | 2/2011 |
| WO | 2011/096614 A1 | 2/2010 |
| WO | 2016139114 A1 | 9/2016 |

* cited by examiner

VALUE OR SECURITY DOCUMENT FROM A FIBRE COMPOSITE MATERIAL AND METHOD FOR PRODUCING THE VALUE OR SECURITY DOCUMENT

BACKGROUND OF THE INVENTION

1. Field of the Invention

The present invention relates to a value or security document, in particular an identification document (ID document), for example an identification card (ID card), comprising an electric circuit, and to a method for producing the value or security document. In particular, the present invention relates to an ID card comprising a (integrated) biometric sensor, comprising an electronic display and comprising an RFID circuit.

2. Prior Art and Background of the Invention

Value or security documents are used for example to identify individuals and/or objects and/or for cashless payment transactions. They have, inter alia, visually recognisable features, which uniquely assign them to an individual and/or an object and/or a cash or securities account, and which allow only the document owner to identify himself/herself or to have access to the object or the account and for example to perform money transfers. For this reason, these documents must be protected against misuse. To this end, they can have, for example, a fingerprint sensor, via which the user can authenticate himself/herself for use of the card, and also a display device.

ID documents are usually produced from plastic materials in order to ensure the necessary flexibility thereof. Value or security documents are often produced by laminating a number of partially graphically designed polymer films, for example polycarbonate films, in a hot/cold lamination press in multiple sheet-fed format or also in a continuous lamination process with a plurality of heating and cooling press stations arranged in succession. Electronic components contained in the documents are usually mounted on a circuit carrier layer, which is connected together with further document layers to form the laminate.

DE 10 2013 102 003 A1 for example describes a chip card module, which can be used as part of a chip card. The module comprises a chip card module carrier, for example made of FR4 material. A wiring structure, an integrated circuit, and a chip card module antenna are arranged on the carrier, wherein the integrated circuit and the antenna are electrically coupled to the wiring structure, and also a lighting device, which is arranged on the carrier and which is electrically coupled to the wiring structure.

DE 10 2012 223 472 A1 also describes a value and/or security document which has an antenna structure. In order to produce the document, the antenna structure is applied to a carrier body, which can be formed as a plastic layer, for example made of polyimide. Further, an electronic component can also be arranged on the carrier body, for example a semiconductor component. Furthermore, sub-modules can also be used as chip carrier, based on flexible printed circuit boards (interposer), for example made of polyimide or FR4.

DE 10 2014 204 552 A1 describes a display module that can be integrated in a blank of a value or security document. The display module comprises a carrier and at least one circuit arranged thereon. The circuit is formed by at least one antenna conductor track and at least one display element electrically connected to the at least one antenna conductor track. FR4 is cited, inter alia, as a substrate material for the carrier for the antenna conductor track.

DE 10 2009 060 862 discloses a method for laminating film layers, in which a carrier film layer equipped with an electronic component, a flow film layer, and a compensation film layer are stacked and laminated with one another to form a film laminate. It is stated that the film layers are preferably made of a thermoplastic. Typical materials of which the film layers are made are polycarbonate, polyvinyl chloride, polyester, for example PET, polyolefins, for example PE and PP, acrylonitrile-butadiene-styrene copolymer, polyurethane and polyether ether ketone.

Problems Addressed by the Invention

It has been found that the production of multifunctional identification documents (multi-component documents) comprising one or more integrated electronic components has been very complex and costly until now. Smartcards of this kind have therefore previously only been produced to a limited extent, for example one-time-password cards with display, i.e. cards in which an authentication is performed with ever-changing password, for example via a method with transaction numbers (TAN) which for example are transmitted by telephone or are transmitted online via a computer.

It has also been found that the known documents produced by lamination have the disadvantage that the stability of the documents comprising an electronic circuit is not sufficient during their use, in particular if the documents have display devices and other exposed electronic components. Furthermore, it is also not ensured in all cases that the electronic components and electrical connections thereof on a circuit carrier are sufficiently protected against mechanical damage.

SUMMARY OF THE INVENTION

The problem addressed by the present invention thus lies in overcoming at least one of the disadvantages of the known value or security documents and production methods thereof and in particular providing documents having increased mechanical stability, particularly against bending load, and simple and economical production methods. These documents should also remain dimensionally stable with longer-term use and should have the necessary high rigidity, in particular torsional resistance, and robustness for this purpose, so as to protect the electronic components contained in the documents, for example against breaking and cracking or tearing at the electrical contact points. The previously used polymer materials which are used to produce smartcards for example do not meet these requirements. Furthermore, a structure for value or security documents in the form of multifunctional smartcards is to be found that corresponds to standard ISO/DIS 18328-2, which was at draft stage on the priority date of this application, with a card thickness of 2.5 mm. The document should also be protected against delamination. The value or security documents should be capable of being used in a versatile manner.

BRIEF DESCRIPTION OF THE DRAWING FIGURES

FIG. 1 shows an isometric schematic illustration of a possible design of a blank of a value or security document, an ID card, in a first variant of the electric circuit;

FIG. 2 schematically shows cross-sectional views of a document blank of a value or security document in a second variant of the electric circuit; (A) prior to the joining process; (B) after the joining process;

FIG. 3 schematically shows views of document layers of the value or security document according to the invention in the first variant of the electric circuit according to FIG. 1 in exemplary embodiments; (A) cover layer; (B) compensation layer; (C) circuit carrier layer with electric circuit disposed thereon; (D) termination layer;

FIG. 4 schematically shows isometric illustrations (A) of the circuit carrier layer and (B) of the compensation layer in the first variant of the electric circuit according to FIG. 1;

DETAILED DESCRIPTION OF THE INVENTION

Figure 1:
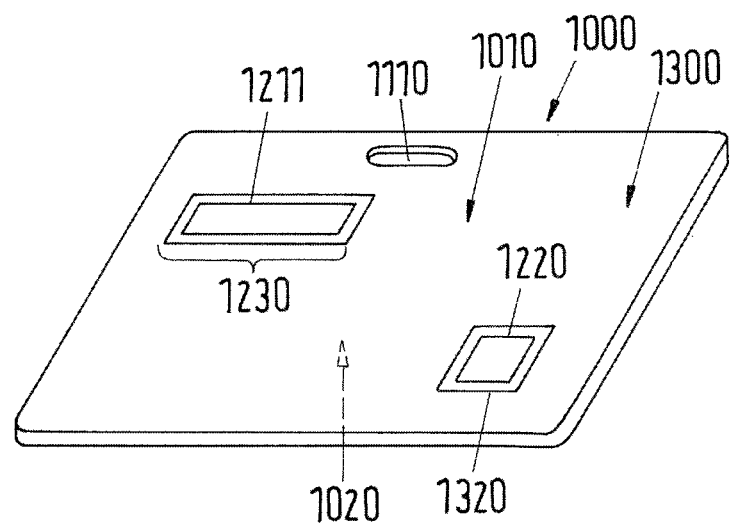

Definitions:

Insofar as terms are used hereinafter in the singular form, for example "electric circuit", "document layer", "circuit carrier layer", "compensation layer", "cover layer", "electronic component", "recess", "opening", etc., the corresponding plural forms can also be understood to be included in each case, specifically "electric circuits", "document layers", "circuit carrier layers", "compensation layers", "cover layers", "electronic components", "recesses", "openings", etc., and vice versa, unless expressly stated otherwise.

Where the term "value or security document" is used in the description and in the claims of the present application, this is understood to mean, for example, a personal identification document, a driver's licence, an access identification document or another ID document, for example an ID card, a vehicle registration document, a cheque book, bank card, credit card or cash card, customer card, heath insurance card, a company ID card, proof of authority, membership card, gift card or shopping voucher, or another credential or even another value or security document. The value or security document can be, in particular, a smart card, if the document is present in card form. The value or security document can be present in ID-1, ID-2, ID-3, ID-T format, or in any other standardised or non-standardised format, for example in card form. Reference is made in this respect to the relevant standard ISO/IEC 7810 in the version thereof valid on the priority date. The format of the document is preferably ID-1. The value or security document should meet the standardised requirements, for example ISO 10373, ISO/IEC 7810, ISO 14443 and, as appropriate, the standard ISO/DIS 18328-2, which is still at draft stage, in each case in the versions thereof valid on the priority date.

The value or security document is characterised in that it contains authenticating information, for example information relating to the person or the thing to whom/to which the document is assigned, or information with which the authenticity of the document can be verified. For example, the value or security document can comprise at least one imprint which is visible without optical aids or which can be read exclusively by machine and which is personalising for the individual to whom the document is assigned or which proves the authenticity of the document. Alternatively or additionally, individualising data can also be contained in an electronic data memory in the document. Or, the document can comprise at least one other security element that can be read using optical means and/or a tactile security element which allows the document to be uniquely assigned to an individual or allows the authenticity of the document to be proven.

Insofar as the term "electronic component" is used in the description and in the claims of the present application, this term is understood to mean any arbitrary active or passive electronic component, in particular a semiconductor component, which can also be referred to hereinafter as an "IC" or "chip". A semiconductor component or IC or chip is, for example, an unhoused semiconductor chip (bare die) or a housed semiconductor chip, for example in the form of a Surface Mount Device (SMD), a Chip Scale Package (CSP), or one of the following designs: DIP, TQFP, MLF, SOTP, SOT, PLCC, QFN, SSOT, BGA, MOB, or a chip module. If the chip is unhoused, it can be used in a thinned form.

Insofar as the terms "individualising", "individualised", "personalising" and "personalised" are used in the description and in the claims of the present application, these terms are to be understood to mean that the value or security document to which the term refers differs from other value or security documents and that this value or security document is assigned to an entity (in the case of the terms "individualising" or "individualised"), in particular a person (in the case of the terms "personalising" or "personalised"). The value or security document, instead of being assigned to a person, can also be assigned to an object, such as a motor vehicle, sales product (in this case the value or security document is for example a packaging or a ticket, label, tag, sticker or the product itself) or a security. By means of the individualisation or personalisation, a third party identifies the unique assignment of the value or security document to the entity or groups of identical or similar entities.

Insofar as the terms "laminating" and "lamination" are used in the description and in the claims of the present application, these terms are to be understood to mean the connection of two layers face-to-face under the action of pressure and introduction of heat, wherein there is no (separate) adhesive material used between the two layers to be connected. During the lamination, a monolithic connection is formed between the layers as a result of the softening or liquefying of the layer materials, i.e. a boundary is not visible after the lamination.

Basic Principles of the Invention and Preferred Embodiments:

In accordance with a first aspect of the present invention, the above problems are solved by a value or security document, in particular by an ID document comprising an electric circuit, and especially preferably by an ID card comprising an electric circuit.

In accordance with a second aspect of the present invention, the above problems are also solved by a method for producing the value or security document comprising the electric circuit.

The value or security document according to the invention is formed of at least three document layers which are arranged in a stack and which are connected together face-to-face by a joining method, wherein a first document layer is formed by a circuit carrier layer which supports the electric circuit, at least one second document layer is formed in each case by a compensation layer which has at least one opening and/or recess, and at least one third document layer is formed in each case by a preferably outer cover layer. The first and the at least one second and the at least one third document layer are formed from a fibre composite material in accordance with the invention. The value or security document, in contrast to a document blank, from which it is produced, contains individualising data.

In order to produce the value or security document according to the invention, a method is used which comprises the following method steps:

(a) providing a first document layer in the form of a circuit carrier layer which supports the electric circuit, at least one second document layer in each case in the form of a compensation layer, which has at least one opening and/or recess, and at least one third document layer in each case in the form of a cover layer;

(b) stacking the first and the at least one second and the at least one third document layer to form a document layer stack;

(c) joining the first and the at least one second and the at least one third document layer non-detachably, wherein a document blank is produced; and (d) individualising the document blank so as to form the value or security document.

The first and the at least one second and the at least one third document layer are formed in accordance with the invention from a fibre composite material.

Since a fibre composite material is used for the document layers in the value or security document, it is ensured that the document is protected against twisting and bending, even with prolonged use. In particular, there are no signs of fatigue of the material, which would lead to a deformation under material load. Even thermal influences do not reduce the dimensional stability of the document, in contrast to documents constructed in the conventional manner. By way of example, the document can therefore be placed on an uneven substrate under intense solar radiation and can be left there over a relatively long period of time without sustaining any damage. The high torsional resistance and robustness of the document is attained by the monocoque structure thereof, that is to say by the connection of all document layers to one another in a lamination process by means of the fibre composite material. This results in protection of the electronic components against damage or even breakage. The document cannot be delaminated and can be easily produced.

Due to the construction of the document exclusively or at least almost exclusively from a fibre composite material, the technology of the generation of base materials used in printed circuit board production can be adopted for the production of value or security documents. The production specifications developed for this technology can be transferred without difficulty to the present technical field. In the production of the value or security document, additional lamination steps with the plastic card materials conventional for known value or security documents can therefore be omitted.

Since the electric circuit of the value or security document can be designed for the storage of individualising data, an extraordinarily high level of data security is made possible, since the enrolment (registration) takes place on the card and the data is recorded, securely stored and verified only in the document. Sensitive data therefore does not leave the document.

The fibre composite material preferably cannot be melted. In the present case, this is to be understood to mean that the material cannot melt without decomposing. The material therefore cannot transition into a liquid state without changing its chemical composition, although the material can have a glass transition temperature at which the material transitions from a brittle glass state into a soft rubber-elastic state. During production, a lamination process is applied in which the layer components are temporarily liquefied. However, the material sets (cures) by means of a chemical reaction (polymerisation) and therefore can then no longer be melted.

The fibre composite material can therefore be formed in particular with a non-thermoplastic matrix material, preferably with a thermoset matrix material, very particularly preferably with a polymer material. The polymer material by way of example can be produced on the basis of a bifunctional or higher functional epoxy resin, in particular on the basis of bisphenol A, or a mixture of an epoxy resin with a bismaleimide/triazine resin. The latter is described by way of example in DE 25 12 085 B2. Alternatively, a phenol resin can also be provided, including phenol resin of the novolak type, also in the form of polyimide or a fluorinated polymer, such as a polymer made from tetrafluoroethylene, which for example is known under the name Teflon® (trademark of DuPont, USA).

The fibre material of the fibre composite material is preferably formed by glass fibres. Alternatively, fibres formed from other materials, such as quartz, aramide, carbon (carbon fibres, for example carbon fibre reinforced plastic (CFRP)), stretched polymer fibres, for example polyester fibres, and the like can also be used. The fibres can be contained in unordered form in the composite material, for example by saturating a fibre felt together with the matrix material and curing the latter. Alternatively, the fibres can also be added to the matrix material in separated form, before said material is then cured. The fibres are advantageously present in the matrix material in the form of a fabric, for example in the form of fabric mats, in particular glass-fabric mats, which are saturated with the matrix material before this is then cured. Glass-fabric mats of this kind saturated with pre-polymerised epoxy resin material are known as prepregs.

In a preferred development of the present invention, the fibre composite material of the first, at least one second and at least one third and possibly further document layers are formed from a thermoset, for example epoxy resin-based, reinforced with glass fibre fabric. Materials of this type are extremely resistant to chemical, mechanical, and thermal influences due to their properties. In addition, these materials also have excellent electric properties, which lend themselves particularly for use as a value or security document having an electric circuit. In particular, the mechanical stability, for example dimensional stability against bending load, is excellent in materials of this type on account of the combination of an unmeltable material by selection of a thermoset and the embedding of a glass fibre fabric in the polymer material.

FR4, FR5 and FR5/BT material can be used as particularly preferred materials. FR4 is produced from glass fibre fabric mats saturated with bifunctional epoxy resin and is flame-retardant on account of the bromination of the resin. FR5 material differs herefrom by the use of higher-functional epoxy resins (tetra-, multifunctional resins). FR5/BT material additionally contains bismaleimide/triazine resin. The Tg points (glass transition temperatures) of these materials increase in the order Tg(FR4)<Tg(FR5)<Tg(FR5/BT). By use of FR5 or even FR5/BT, a higher thermal resistance can be achieved.

In a further preferred development of the present invention the joining method is a lamination method, and therefore no boundaries are visible between the document layers in the value or security document created by lamination. In the lamination method the document layers are connected to one another face-to-face under the action of heat and application of pressure. To this end, the stack formed of the document layers is clamped between pressing tools, for example pressing stamps, pressing sheets or pressing plates, and is placed under pressure and at the same time heated, so that the resin material of the document layers firstly softens and then cures. The lamination methods are characterised in that the document layers are brought into contact with one another directly without further materials arranged therebetween and are thus directly connected to one another. The formed connection is non-detachable. There are discontinuous and continuous lamination methods, i.e. methods in which the stacks are clamped between predefined pressing tools during a predefined period of time and are subjected to the lamination method (discontinuous method) or are guided through a lamination device whilst they are subjected to the application of pressure and the heating. The laminates obtainable with the lamination method are extremely stable with respect to delaminations or other interfering influences. A very firm and rigid structure is formed. Merely the fibres of the fibre composite are still visible in the finished laminated document blank. The proportions of the laminate formed by the resin are combined to form a uniform body and thus constitute a monolithic mass in which the fibres are embedded.

Alternatively, the joining method can also be an adhesive bonding method in principle, in which an adhesive is introduced between the document layers.

The circuit carrier layer carries the electric circuit in that wiring patterns (conductor tracks) are produced on and/or in the circuit carrier layer, for example using methods that are conventional in the field of printed circuit board technology for producing conductor tracks, and in that electronic components are mounted on the circuit carrier layer in accordance with the desired circuit layout and are connected to the conductor tracks. To this end, copper conductor tracks by way of example are structured by means of photolithographic methods and etched or are chemically deposited on the surfaces of the circuit carrier layer using chemical methods, or conductor tracks are produced with a conductive paste, for example with silver particles contained therein, using a printing method. The circuit carrier layer can be a printed circuit board provided on one side with a wiring pattern or provided on each of its two sides with a wiring pattern or can be provided in the form of a multi-layer printed circuit board (multilayer). The electronic components are preferably fixed on the circuit carrier layer by means of an adhesive. At the same time or subsequently, electrical connections are produced between the contact faces of the components and the conductor tracks by means of a conventional soldering or bonding method. To this end, before the soldering process is performed or already before the components are placed on the circuit carrier layer, a solder stop mask can be applied to the surface of the circuit carrier layer to be equipped with the components. By producing the electronic circuit on the circuit carrier layer, a circuit layer is formed which comprises the circuit carrier layer, the conductor tracks and the electronic components. The circuit carrier layers for a plurality of document blanks are typically firstly provided in a multiple-up layout with the conductor tracks and, as applicable, with the solder stop mask, whereupon the multiple-up layouts of the circuit carrier layers are then equipped with the electronic components and for this purpose are subjected to a soldering or bonding process.

The electric circuit is formed by a wiring consisting of conductor tracks and the electronic components. The wiring can be equipped with one or more electronic components. The electric circuit can be provided in a plurality of wiring levels on and/or in the circuit carrier layer, more specifically either on one or both outer sides of the circuit carrier layer and/or in one or more levels arranged inwardly in the circuit carrier layer. Electric connections between the individual wiring levels are produced through metallised holes in the circuit carrier layer.

The at least one compensation layer lies, in the stack to be joined, face-to-face against the circuit carrier layer, more specifically on the side on which electronic components are disposed on the circuit carrier layer. Should the circuit carrier layer be equipped on both sides with electronic components, a compensation layer bears against each of the two sides of the circuit carrier layer.

The at least one compensation layer is preferably characterised in that it comprises openings or at least recesses at the points at which the electronic components protrude on the sides of the circuit carrier plate beyond the surfaces thereof against which the compensation layers bear face-to-face. The electronic components can thus protrude into the openings or recesses. In contrast to openings, the recesses do not pass through the compensation layer fully and are therefore closed on one side. In a further preferred development of the present invention at least one electronic component, inclusive of at least one input device, for example a biometric sensor or a camera, and/or at least one output device, for example a display device or a speaker, are/is arranged at least on one side of the circuit carrier layer, and the compensation layer in this case preferably has at least one recess and/or opening on this side of the circuit carrier layer, wherein at least one electronic semiconductor component, inclusive of at least one output device and/or at least one input device and/or also another electronic component, in an assembled state is received by a recess and/or opening in the compensation layer. It is thus achieved that these electronic components are protected against breaking or cracking or tearing off of the electrical contacts thereof under a mechanical loading of the document. In this case, use is made of the fact that the recesses and/or openings are larger than the electronic components, and therefore the components, when the compensation layer is assembled with the circuit carrier layer, are distanced from the recess or opening walls and cavities are provided between the components and the recess or opening walls. For the aforementioned purpose, the thickness of the compensation layer in the region of the recesses and/or openings is preferably at least as great as the height by which the components are raised above the circuit carrier layer, such that the components at best terminate flush with the outer face of the compensation layer on the side opposite the circuit carrier layer, but under no circumstances protrude beyond said outer face. Effective protection of the components against mechanical damage is thus provided. The compensation layer in this case compensates for unevennesses that would be formed otherwise by the electronic components, i.e, they are used for height compensation. Should the circuit carrier layer be equipped with electronic components on both sides, compensation layers are arranged on both sides of the circuit carrier layer, and therefore the respective components can be received by corresponding recesses and/or openings in the compensation layers. The above explanations apply accordingly for electronic components and compensation layers on both sides of the circuit carrier layer.

In a further preferred development of the present invention, the aforementioned at least one cavity, which is formed by the at least one recess and/or opening of the at least one compensation layer and the at least one electronic component received by the recess or opening, is filled with a polymer material once the circuit carrier layer has been brought together with the at least one compensation layer. This polymer material cross-links during the assembly process and forms a casing around the electronic components within the document blank. This polymer material is preferably resilient after the cross-linking, so that it can absorb and dissipate shear and compressive forces. Alternatively, a further document layer can also be arranged as flow layer on the side of the compensation layer facing away from the circuit carrier layer, the thermal properties of said further document layer being designed so that this layer, with the assembly of the document blank, in particular with a thermal treatment step, for example during lamination, softens, flows into the cavities, and in so doing fills the cavities. To this end, the softening point of the polymer material of this flow layer is to be selected to be low enough that the material softens or liquefies at the used joining temperature and flows into the cavities. The polymer material filling the cavities or the material of the flow layer is preferably transparent so as to ensure that a display device encased by the material remains visible from the outside.

The at least one cover layer is used to close any outwardly open openings in the compensation layers. Should the circuit carrier layer be equipped only on one side with electronic components, such that a compensation layer is necessary only on this side, a cover layer is also necessary only on this side. Should compensation layers be arranged on both sides of the circuit carrier layer, but only one of the compensation layers have openings, and the other have exclusively recesses for receiving the electronic components disposed there, only one cover layer is therefore again necessary in order to cover the outwardly open openings.

In a further development of the present invention, the at least one cover layer comprises an opening, so that a sensor device arranged therein is exposed outwardly. For example, contact with a biometric sensor, for example a fingerprint scanning device, by means of a finger from the front side of the document is thus made possible. Alternatively the sensor device can also be a camera. In this case, the opening ensures that the camera can capture images trouble-free. This opening is therefore disposed at the point in the cover layer at which the sensor device is disposed on the circuit carrier plate. Otherwise, the at least one cover layer preferably does not have any recesses and/or openings.

A security print of the at least one cover layer and/or an opaque inner layer can also be interrupted in regions, so that a viewing window is formed, so that for example a display device arranged there behind is visible from outside. This of course presupposes that the material of the cover layer is transparent per se or at least translucent, and the cover layer is opaque only as a result of the security print.

In a further preferred development of the present invention the at least one cover layer and the circuit carrier layer are transparent or translucent. As a result, light emanating from a lighting device, for example an LED, which is disposed within the document, is visible from outside. In particular, it is advantageous if this light is visible from both sides of the document, so that the document can be easily operated by a left-handed person and also by a right-handed person. Furthermore, the light is thus seen comfortably when the document is held using the thumb or index finger on the fingerprint scanning device. In order to identify this appearance of light, it is sufficient if the transparency or translucency is limited to the region in which the lighting means emits the light. The cover layer can comprise a print layer, however this is preferably interrupted at the location where the lighting device is disposed on the circuit carrier layer.

It is clear from the above explanations that the at least one second document layer is preferably disposed between the first and one of the third document layers.

The circuit carrier layer, the at least one compensation layer, and the at least one cover layer can be so thin that they are bendable (film-like), and for example each have a thickness in a range from 50 µm to 500 µm. The circuit carrier layer, the at least one compensation layer, and the at least one cover layer preferably have the same format and the same size in the finished, produced document blank. However, only after having been connected are these layers typically produced in their end format and their end size by separating the document blanks from a multiple-up layout.

In yet a further preferred development of the present invention, the value or security document can have yet a further document layer in the form of a termination layer on the side of the circuit carrier layer opposite the compensation layer. The termination layer is therefore disposed in a preferred development of the present invention on the side of the document that is opposite the side on which the compensation layer and the cover layer are disposed. The termination layer can preferably be transparent or translucent, similarly to the cover layer. Alternatively or additionally the termination layer can comprise a print layer, however this is preferably interrupted at the location where a lighting device or as appropriate also a sensor device is disposed on the circuit carrier layer. The termination layer, similarly to the cover layer, serves primarily to protect the wiring and the electronic components within the document against external influences. The termination layer is also formed, similarly to the circuit carrier layer, the at least one compensation layer, and the at least one cover layer, by a fibre composite material. The material can preferably be the same as for the aforesaid document layers.

The imprint on the cover layer and/or the termination layer is preferably disposed on the inwardly pointing side of the layer, so that it is protected against mechanical damage, such as abrasion. In principle, however, it is also possible that the imprint is disposed on the outer side of the particular document layer. The imprint of the cover layer and/or the termination layer can serve to provide a coloured individualisation/personalisation of the document blank. By way of example, one of the two layers or both layers can be imprinted with individualising/personalising information of the document owner, for example with a facial image of the document owner, with data relating to the owner in alphanumerical form, such as the name, date and place of birth, address, and the like, and/or the signature of the owner. Instead of the individualising/personalising print or additionally thereto, a non-individualising (decorative/security) print can also be printed onto the layer(s). These decorative/security prints are preferably applied to the inwardly pointing faces, but can also be applied externally in principle.

In addition to the cover layer and the termination layer, further outer layers can also be provided. In this case, these further outer document layers have an imprint as necessary, instead of the cover and/or termination layers covered by said further outer document layers. However, these further document layers can also be formed merely as transparent or translucent layers, through which the imprint of the cover and/or termination layers remains visible from the outside.

In a further preferred development of the present invention, the electric circuit comprises an RFID circuit with an RFID-IC (integrated circuit), which is an electronic semiconductor component, and an RFID antenna, furthermore at least one input device, for example a biometric sensor device and/or a camera and/or a keypad, and at least one output device, for example an electronic display device (display). A multifunctional interactive identification document can thus be provided. In addition, the electronic circuit can contain further electronic components, preferably a central processor, a crypto-processor and a power management system. By means of a suitable system architecture, a high level of data protection can be achieved with the aforesaid components because sensitive biometric data of the document owner is stored cryptographically exclusively in the document and is thus securely protected. Alternatively to the RFID circuit or additionally thereto, the circuit layer can also carry an IC module provided with contact faces exposed on an outer side of the document. As a result of the integration of the RFID circuit into the value or security document, contactless communication of the value or security document with an external writing/reading device and an external power supply is possible. The electric circuit can also comprise, as further electronic component, at least one display light source, for example an LED, with which an optical signal can be delivered, for example such that a reading process indicates successful authentication (green) or such that a reading process indicates unsuccessful authentication (read). Alternatively or additionally, the document can be equipped with an acoustic signal emitter, for example a speaker.

The RFID antenna can be formed by a number of coil-like turns, which for example are arranged in a single circuit level. By way of example, the turns of the antenna are printed onto the circuit carrier layer. The RFID IC is connected to the turns of the antenna. The turns of the antenna can be printed for example onto the circuit carrier layer. This printing process can be performed using a relevant known printing technique constituted by through-printing, gravure printing, relief printing and flat printing or digital printing. In accordance with a preferred embodiment of the invention, the antenna is coiled and is arranged in an edge region of the document. Here, the turns of the antenna are arranged preferably peripherally along the edge of the document, that is to say the individual turns are arranged adjacently. By way of example, the antenna is formed with a printed-on paste, which contains conductive particles, in particular with a silver conductive paste, or another conductive material, for example a conductive polymer.

The RFID IC can be provided as an unhoused or housed chip in one of the above-mentioned designs. If the RFID IC is provided as an unhoused chip, it can be mounted on the circuit carrier layer by flip chip adhesive bond technology and connected to the antenna. By way of example, it can be electrically and mechanically connected to the antenna in the known manner via an anisotropically conductive adhesive and by means of a collapsed solder. The RFID IC has a memory, into which preferably individualising, particularly preferably personalising information can be written. By way of example, biometric information of the document owner, such as a facial image, fingerprints, specimen signature, also the name, date of birth, address and the like, can be written in.

The at least one input device can be formed for example by a biometric sensor, a switch, a keypad or an acceleration sensor. The biometric sensor device can be, for example, a fingerprint scanning device, a vein scanning device, or a camera, for example for capturing an image of the iris.

The at least one output device can be formed for example by an electronic display device (display), a speaker, or a vibration emitter. The electronic display device comprises an optical display element, which serves for visual representation, preferably of individualising/personal data. The display device can preferably be embodied in a bistable manner, so that it retains its information in the currentless state. Displays of this type are preferably formed as electrophoretic, ferroelectric or cholesteric liquid-crystal displays in a preferred development of the present invention. Individualising/personalising data can thus be permanently displayed. For example, this device can be used to personalise the value or security document by means of the portrait and the name of the document owner. In this case, an additional optical personalisation by personalising prints is no longer necessary. The electronic display element can also be formed by a passive or active, self-lighting display system on the basis of OLED elements. In the case of active OLED elements, the display is activated with the aid of a reading device or via an installed power source, whereby the presentation is then visually recognisable. The display element is preferably operated via a display driver IC. The display device can be mounted on a separate display carrier, which is in turn mounted on the circuit carrier layer. The display device preferably has contact points at the edge, via which the display device is electrically connected to the conductor tracks on the circuit carrier layer.

The at least one input device, for example the biometric sensor, can be electrically connected to a central processing processor IC, which controls said sensor. Furthermore, a connection to a crypto-processor can exist, on which processor encryption algorithms can be stored. The central processor IC is preferably electrically connected to the at least one output device, for example an electronic display device.

The value or security document is preferably not equipped with a power source, for example a battery, but instead with a contactless power supply. It is thus ensured that the document can be held ready for operation over a very long period of time. This is because the use of a battery limits the period of usability of the document to one or two years. The electrical energy necessary for the operation of the electronic components, in particular of the at least one output device, for example a display device, can be fed from a writing/reading device via the RFID antenna of the document.

The value or security document is preferably designed in such a way that it can be comfortably used both by right-handed individuals and left-handed individuals. To this end, it contains input devices, for example biometric sensors, and/or output devices, for example display devices, on both sides of the document. Furthermore, for this purpose, the at least one display light source, for example LED, can also be integrated in the value or security document in such a way that the signalling thereof is visible from both sides of the document and is thus independent of the orientation of the document in which the user is holding the document, i.e. with the left or right hand. As appropriate, this also enables the further use variant that the user, instead of using his thumb, uses his index finger, which is better suited, and thus uses the document in a reverse orientation. A further configuration with fingerprint sensors provided on both sides also enables simultaneous authentication by means of index finger and thumb when the document is held between these two fingers.

The document blanks are preferably produced in the form of multiple-up layouts, even though production in the form of a one-up layout is of course also possible in principle. The multiple-up layouts are produced from corresponding multiple-up layouts of circuit carrier layers, multiple-up layouts of compensation layers, multiple-up layouts of cover layers, and as applicable multiple-up layouts of further document layers by stacking the multiple-up layouts of the individual layers and then connecting these to one another, preferably laminating them. The obtained multiple-up layouts of the laminates are then separated into individual repeats, for example by means of a punching, milling or laser-cutting method, by means of which the two-dimensional form of the document blanks can be produced. The outer sides of the document blanks can also lastly be polished/planarised in order to produce smooth surfaces. As appropriate, coatings for a subsequent printing can be applied externally (on one or both sides, over the entire area or only over partial areas). Coatings of this kind can be formed from materials that are conventional in card technology for the plastic layers, for example from polycarbonate, polyethylene terephthalate, polyvinyl chloride, polyurethane and the like. Materials of this kind can be formed in particular in such a way that when they are touched no fingerprints remain on the surface. To this end, these coatings can preferably be matt.

In order to carry out the joining method, a conventional laminating device can preferably be used, once the individual layers have been brought together in a stack. The lamination method typically has a warm cycle and a cold cycle. To this end, the lamination device can be a conventional hot/cold lamination press, which enables operation either in a batch method or continuous method.

The assembled and joined blank of the value or security document contains the above-described document layers in the joined state, wherein layers adjacent to one another are no longer discernible as such, but instead appear as a monolithic layer block. By contrast, the fibres of the fibre composite materials are still visible even after the lamination. There are preferably no cavities present between the layers and in the surrounding environment of the electronic components. Cavities originally present are preferably filled during the joining process by the materials joined to one another. Cavities originally present in the surrounding environment of the electronic components can be filled with a polymer material used additionally to the document layers, which polymer material likewise can be separately discernible when the document is cut through.

Once the document blanks have been produced, the value or security document is produced from said blanks by individualisation. To this end, the individualising data is read into the document blank, more specifically into the RFID chip, by means of an RFID reading/writing device and is stored therein (electronic individualisation) and as appropriate is displayed on the display device or output by another output device. When an electrophoretic, ferroelectric or cholesteric display device is used, this display can be permanent, such that further individualisation steps, for example by printing the document blank, can be omitted. An electrophoretic display device is suitable specifically for a permanent display of visible information also in the currentless state. Furthermore, a graphic design and individualisation of the document blank can be provided by printing, for example by means of inkjet digital printing or re-transfer or thermal transfer printing methods or by laser inscription in an inner laser-sensitive document level (optical individualisation: for example photograph of the document owner and personal information and information of the company with which the owner is affiliated). In this case, an external printing can be protected by a subsequently applied protective coating or a protective film. Otherwise, the inlaying of the graphical cover and termination layers is a possibility for a graphical design of the outer sides of the documents, which layers, as described further above, are arranged above and/or below the layer stack formed of the circuit carrier layer and compensation layer(s) in the layer stack to be laminated.

The value or security document according to the invention, in addition to the described security elements and features, can have further security features, which either are individualising or not individualising. Coloured fibres, guilloches, watermarks, embossments, security threads, micro text, tilt-effect pictures, holograms, optically variable pigments, luminescent dyes, see-through registers, surface structures, and the like can be considered as further security features.

The drawings described hereinafter, which illustrate the invention merely in an exemplary manner with exemplary embodiments, serve to explain the present invention in greater detail.

Like reference signs in the drawings denote like elements or elements having the same function. The drawings do not always show the parts to scale. Further, the proportions of individual elements in relation to those of others shown within the same drawing or in different drawings also are not always illustrated to scale.

Where an ID card 2000 and an ID card blank 1000 are described hereinafter, this description relates to any value or security document and, respectively, associated blank accordingly.

Figure 4:
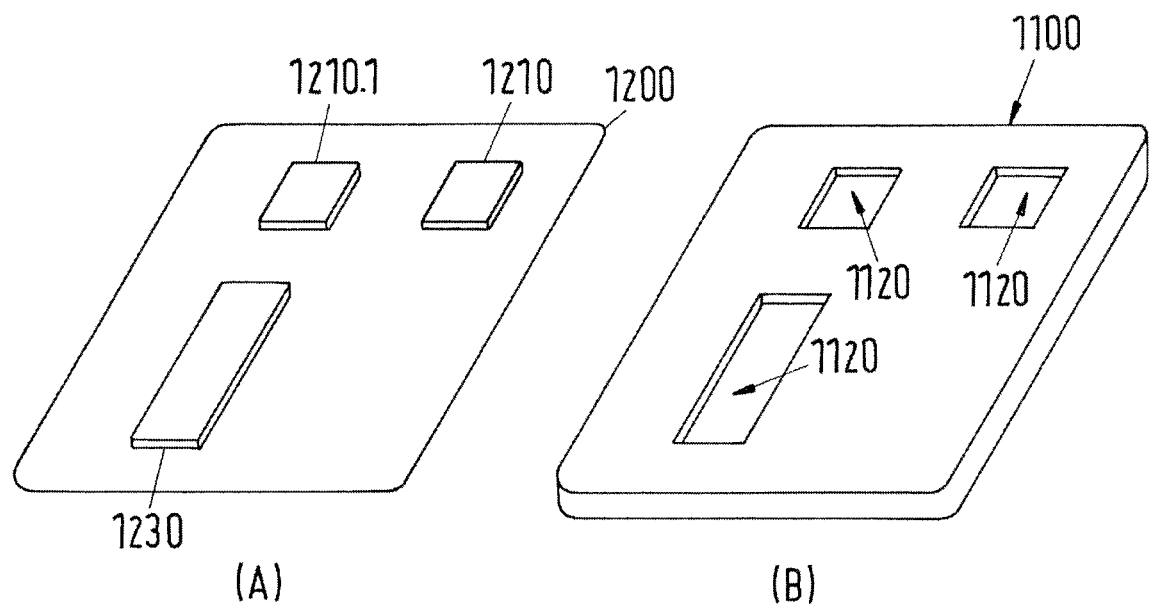
Figure 3:
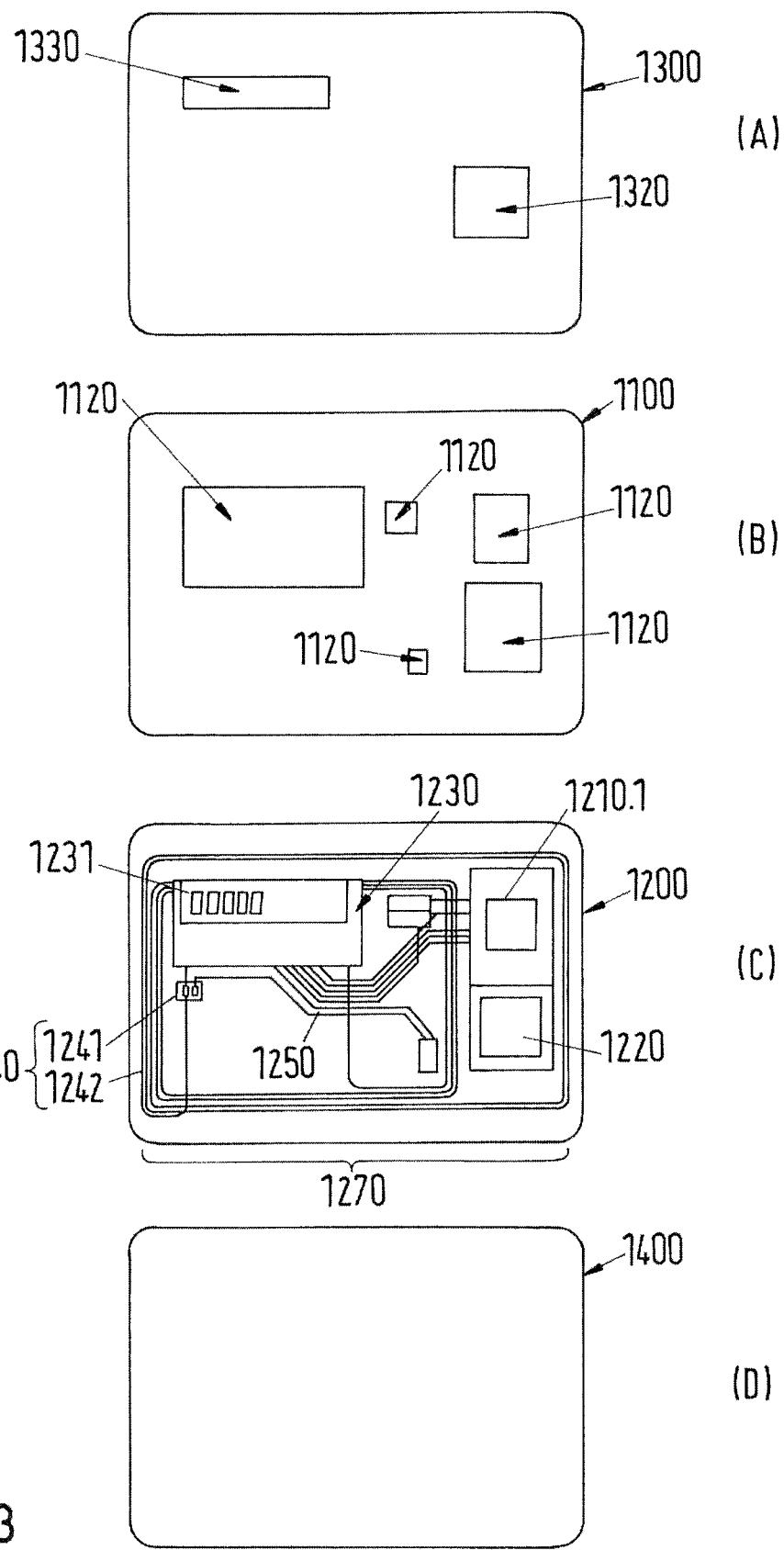

The ID card blank 1000 shown in FIG. 1 with an upper visible side 1010 and a lower visible side 1020 comprises at least one display element 1231 of a display device 1230 (FIG. 3C) and a biometric sensor 1220, for example in the form of a fingerprint scanning device or a vein scanning device. The biometric sensor is exposed through an opening 1320 in the cover layer 1300, which is arranged at the top. An RFID circuit 1240 (FIG. 3C), consisting of an RFID chip 1241 and an RFID antenna 1242, is not visible from outside. In addition, further circuit constituents and components 1210, for example a central processor 1210.1, are arranged beneath the cover layer and are not visible from outside. All electronic components and conductor tracks together form an electric circuit 1270 (FIG. 3C). A circuit carrier layer 1200 with the electric circuit and a compensation layer 1100 are also shown in FIG. 4.

Figure 2A:
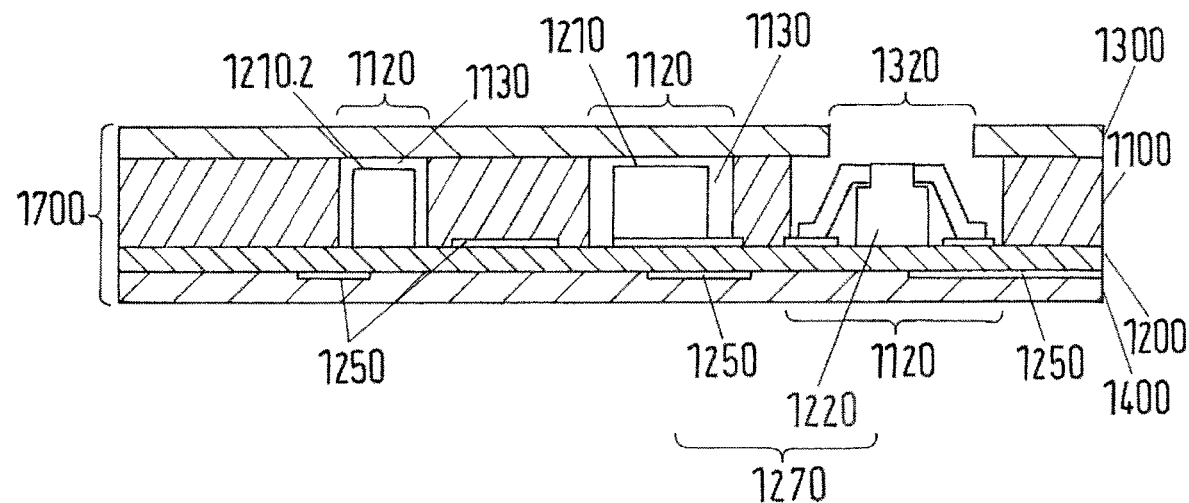
Figure 2B:
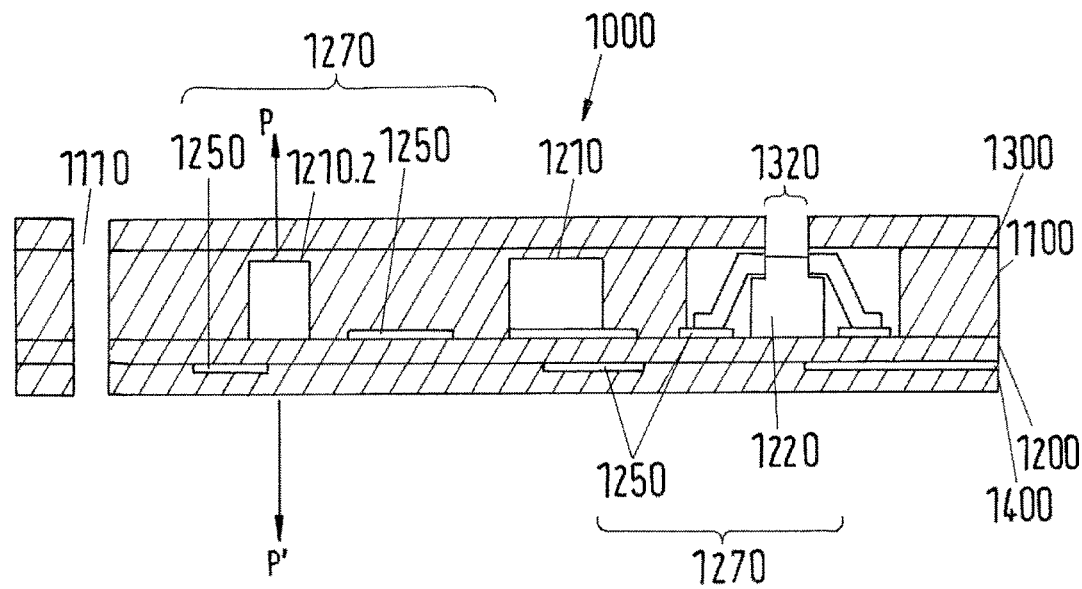

FIG. 2 shows the blank of the ID card according to the invention prior to the joining process (FIG. 2A) and thereafter (FIG. 2B). In FIG. 4 the circuit carrier layer (FIG. 4A) and the compensation layer (FIG. 4B) are shown additionally in an isometric illustration in exemplary embodiments.

FIG. 2A shows the document layers 1100, 1200, 1300, 1400, which are brought together prior to the joining process to form a document stack 1700: a circuit carrier layer 1200 comprising an electric circuit 1270, a compensation layer 1100 with openings 1120, a cover layer 1300 with an opening 1320, and a termination layer 1400 arranged there beneath. These four layers are all formed from a fibre composite material, preferably from a non-melting material, for example from FR4 material. To this end, glass fibre mats are saturated with an epoxy resin and dried, thus producing prepregs. The resin in these prepregs is not yet fully cured (cross-linked). The resin is in the B stage. Different thicknesses of the individual layers can be produced either by glass fibre mats having different fibre thicknesses or by laying a plurality of prepregs one on top of the other. The prepregs are preferably transparent or at least translucent. Due to the presence of the glass fibre mats in the prepregs, these are merely translucent as appropriate. The transparency or translucency of the finished, laminated ID card blank 1000 or of the ID card 2000 is dependent, however, on the respective indices of refraction of the materials: If the index of refraction of the fibres contained in the material is approximately (±0.1) the same as the index of refraction of the cured resin in which the fibres are embedded, the fibres are no longer easily visually perceptible, and therefore the material is transparent due to a lack of light refraction. Otherwise, the material is translucent. In any case, light from a light source (LED 1210.2) laminated into the ID card is visible from both sides of the card (see arrows P, P' in FIG. 2B). In addition, a display element 1231 (FIG. 3C) laminated into the card is thus also perceptible from outside, and therefore the display can be read from outside. The light sources can be arranged annularly around the sensor or on the side in order to illuminate the document edge.

The compensation layer 1100 is disposed on the side of the circuit carrier layer 1200 on which electronic components 1210, 1220 are mounted on said circuit carrier layer. On the other side of the circuit carrier layer, a termination layer 1400 bears against the circuit carrier layer. The cover layer terminates the stack 1700 upwardly and closes the openings 1120 disposed in the compensation layer (with the exception of the opening through which a fingerprint sensor 1220 or a camera is exposed outwardly).

Openings 1120, 1320 are contained in the compensation layer 1100 and in the cover layer 1300 and have been produced for example by punching out holes in the prepregs. The openings 1120 in the compensation layer are produced at the points at which electronic components 1210, 1220 are disposed there beneath on the circuit carrier layer 1200 in the brought-together stack 1700. These components can therefore protrude into these openings when the layers are brought together. The thickness of the compensation layer preferably corresponds approximately to the height of the components above the circuit carrier layer, so that the components terminate approximately flush with the surface of the compensation layer, which is opposite the circuit carrier layer. In any case, the components should not protrude beyond this surface, and therefore they are disposed fully within the openings (FIG. 2A). Any cavities 1130 which form in the assembled state between the electronic components and the compensation layer, because the openings are larger than the components, can be filled with a polymer, for example with a thermoplastic polymer (not shown), once these two document layers have been assembled, which polymer is still resilient in the ready-to-use state and can therefore absorb shear loads. Alternatively, the resin material flows into these cavities at the pressure applied during the lamination. As a result of this construction, the electronic components are protected against external mechanical influences. This polymer is preferably transparent, in particular for the embedding of a display light source (LED) 1210.2 and the display element 1231 (not shown), so that the displays thereof are visible from outside.

The opening 1320 in the cover layer 1300 is disposed at the location at which a biometric sensor 1220 is arranged on the circuit carrier layer 1200, if this has to be exposed outwardly in order to perform its function, for example a fingerprint sensor or a camera.

The circuit carrier layer 1200 comprises wiring patterns 1240, 1250 on both of its sides. In addition, wiring patterns can likewise be disposed in the inner levels in the circuit carrier layer (multi-layer printed circuit board). In addition, electronic components 1210, 1210.2, 1220, 1241 are mounted on one side of the circuit carrier layer, i.e. are glued thereto and electronically connected to the wiring pattern. There is at least one display light source 1210.2, for example LEDs, in particular an LED that illuminates red and an LED that illuminates green, as well as a biometric sensor 1220, for example a fingerprint sensor, and a further electronic component, for example an RFID chip 1241 (not shown in FIG. 2A or 2B).

The variants for the electric circuit shown in FIGS. 1 to 4 differ from one another, wherein however electronic components of one variant can also be contained in the other variant, even if they are not shown in the figures.

Once the aforesaid card layers 1100, 1200, 1300, 1400 have been brought together to form a stack 1700 and the layers in the stack have been aligned with one another, the stack is placed in a lamination press. The stack is laminated therein to form a layer composite by exerting pressure onto the stack and heating it at the same time. In so doing, the resin of the prepregs starts to flow and the resin of the adjacently arranged layers combines and cures. As a result of the pressure, cavities 1130 in the openings 1120 in the region of the electronic components 1210, 1210,2, 1220, 1241 are filled with the resin, and therefore the components are fully enclosed by the cured resin. Merely in the region of the biometric sensor 1220 does there remain an opening upwardly, so that the sensor is exposed outwardly. Lastly, the ID card blank 1000 is also provided with a slot 1110 for a lanyard in an edge region of the blank. This slot is formed for example by punching or milling.

The ID card blank 1000 produced by lamination forms a monolithic body. The originally provided individual layers 1100, 1200, 1300, 1400 are no longer visible after the lamination, since the resin regions have fused with one another without forming a boundary. Merely in a cross-section, which can be produced by a cross-cut, are the individual layers still indirectly visible on the basis of the glass fibre mats or other fibres contained in them, without, however, their original delimitations being able to be reconstructed. The delimitations of the individual layers shown in FIG. 2B serve merely for illustration.

The individual layers 1100, 1200, 1300, 1400 can be arranged firstly in a multiple-up layout with, for example, 5×6 individual repeats (not shown in the drawings). When laminating, a multiple-up layout of, for example, 5×6 blanks 1000 is thus created. The blanks can be separated (cut out) from the multiple-up layout laminate for example by punching or milling.

Since the prepregs used to form the layers 1100, 1200, 1300, 1400 are transparent or translucent, a signalling emanating from the display light source 1210.2 is visible from both sides of the blank 1000/of the ID card 2000 (see arrows P, P'). The display light source can display for example the status, for example with green light can signal that the finger has been recognised by the fingerprint sensor 1220, or with red light can signal that the finger has not been recognised.

Since the signalling is visible from both sides of the blank/of the ID card on account of the transparency or translucency of the material arranged there above, the document can be used comfortably by left-handed and right-handed individuals. Furthermore, user information can also be provided with this display variant when the user places his index finger, which is better suited biometrically, on the sensor. In this case, the user can hold the ID card between the thumb and index finger and for example can comfortably initiate the opening of a door single-handed.

Figure 6:
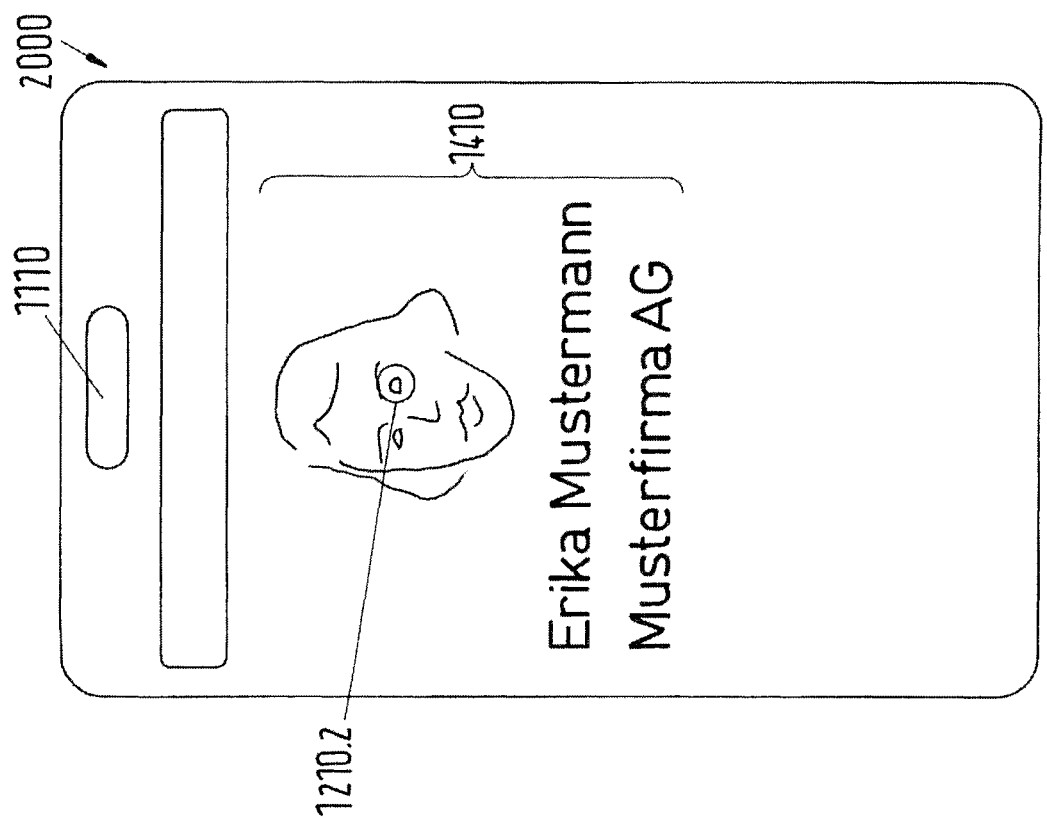
FIG. 6 shows a schematic plan view of the personalisation side of a value or security document in the second variant of the electric circuit according to FIG. 2 in the first embodiment according to FIG. 5.
Figure 5:
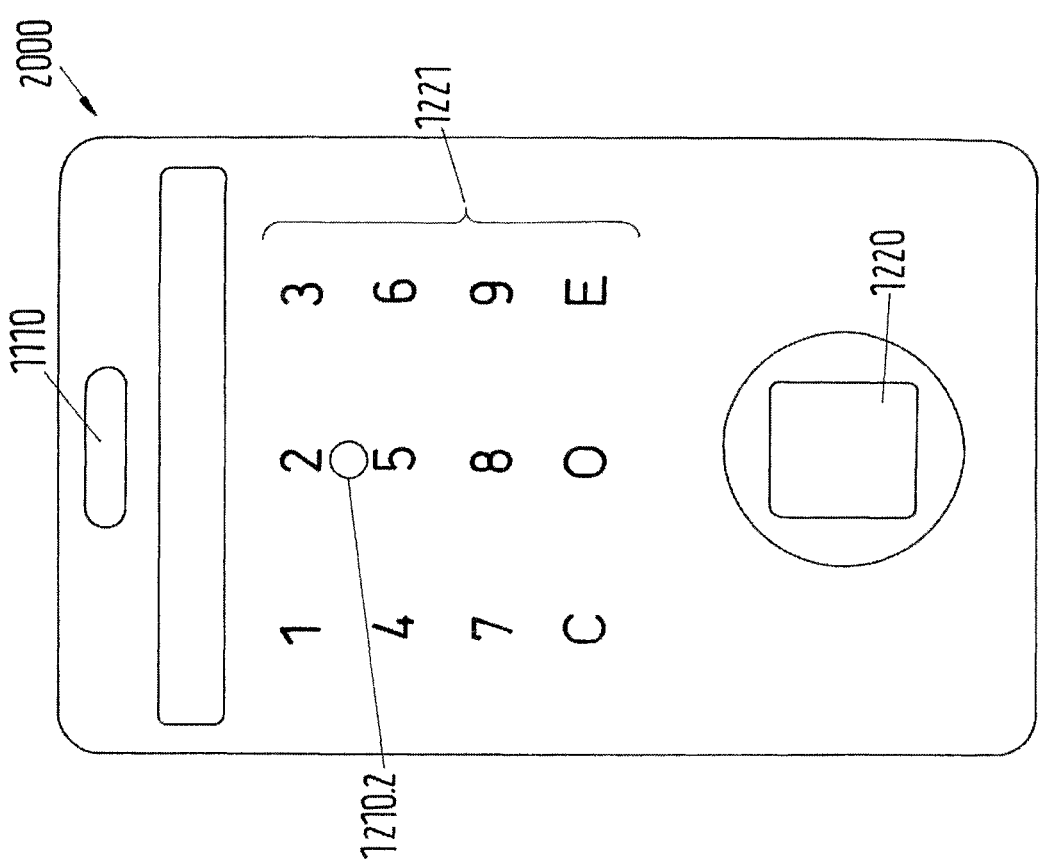
FIG. 5 shows a schematic plan view of the sensor side of a value or security document in the second variant of the electric circuit according to FIG. 2 in a first embodiment.

An ID card 2000 produced from the ID card blank 1000 shown in the cross-sectional view of FIG. 2 is shown from the sensor side in FIG. 5 and from the personalisation side in FIG. 6. This ID card, on the sensor side, has a fingerprint sensor 1220 and a capacitive PIN pad 1221. The card has a personalisation print 1410 on the personalisation side. In addition, the lighting provided by an LED 1210.2 is visible from both sides.

Figure 7:
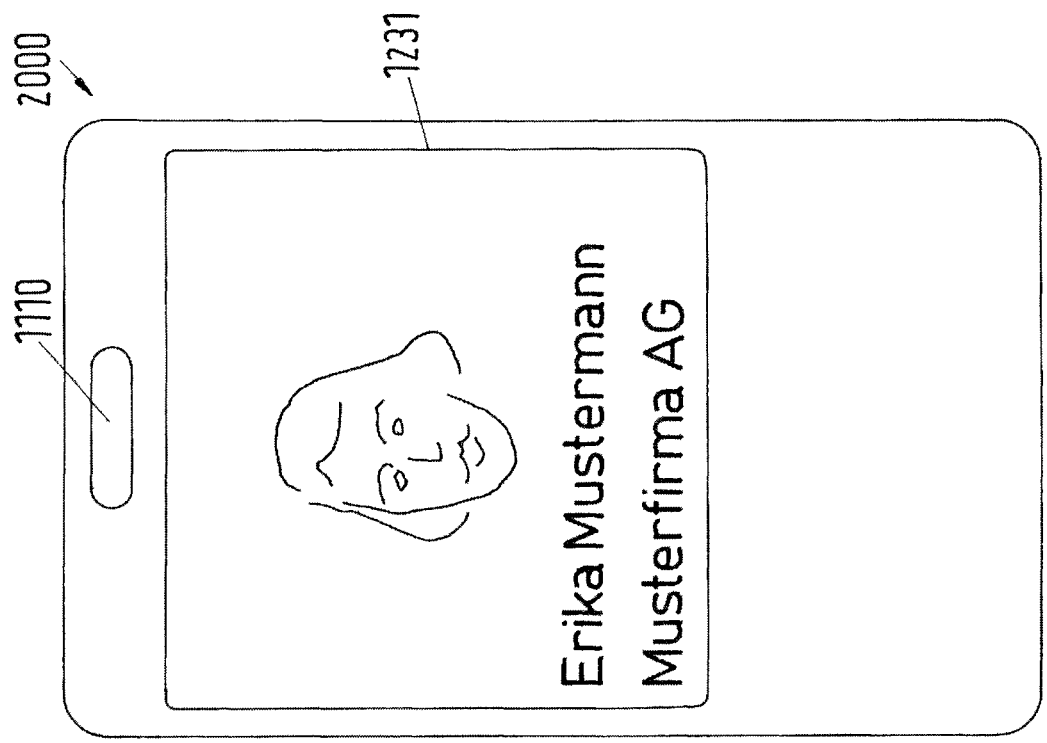
FIG. 7 shows a schematic plan view of the sensor side of a value or security document in the second variant of the electric circuit according to FIG. 2 in a second embodiment.
Figure 8:
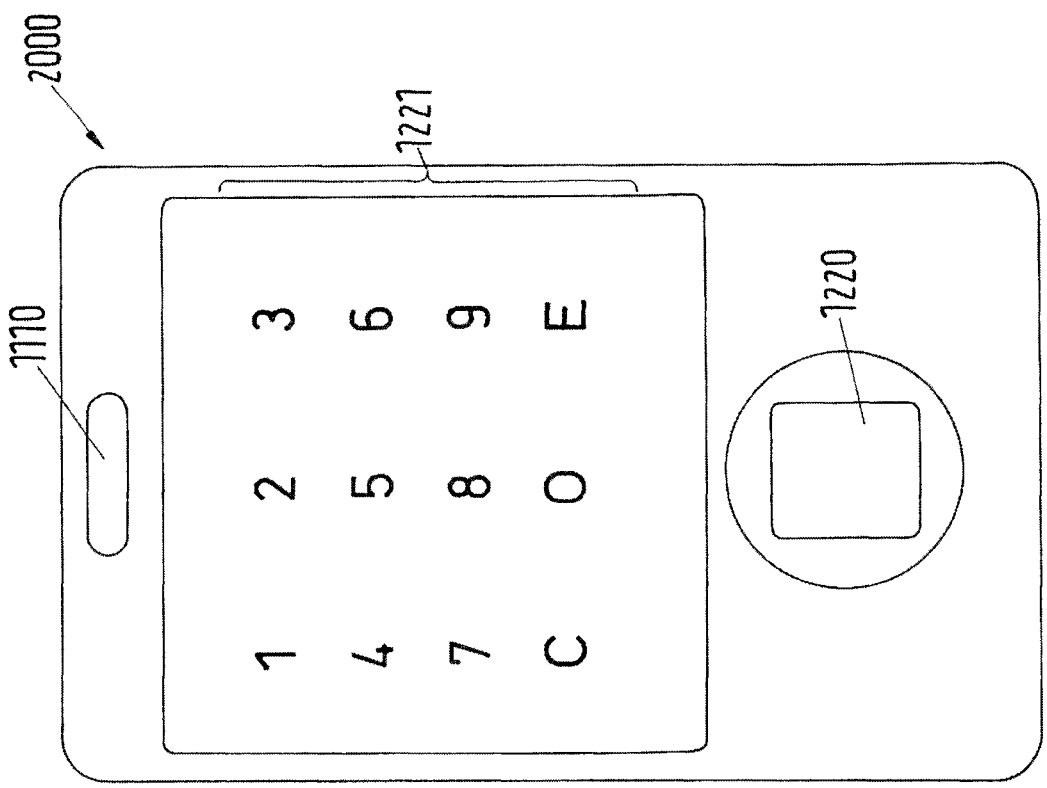
FIG. 8 shows a schematic plan view of the personalisation side of a value or security document in the second variant of the electric circuit according to FIG. 2 in the second embodiment according to FIG. 7.

Furthermore, an ID card 2000 in a second embodiment is shown from the sensor side in FIG. 7 and from the personalisation side in FIG. 8. This ID card comprises a fingerprint sensor 1220 and a touch display 1221 on the sensor side and a personalisation display 1231 on the personalisation side. This display can be formed as a bistable electronic display element, preferably in the form of electrophoretic, ferroelectric or cholesteric liquid-crystal display, so that it retains its information in the currentless state. The personalisation data for the personalisation of this card is read into the memory of the blank 1000 or the ID card 2000 by means of a reading/writing device 3000 (FIG. 9) and is then shown on the display.

Figure 9:
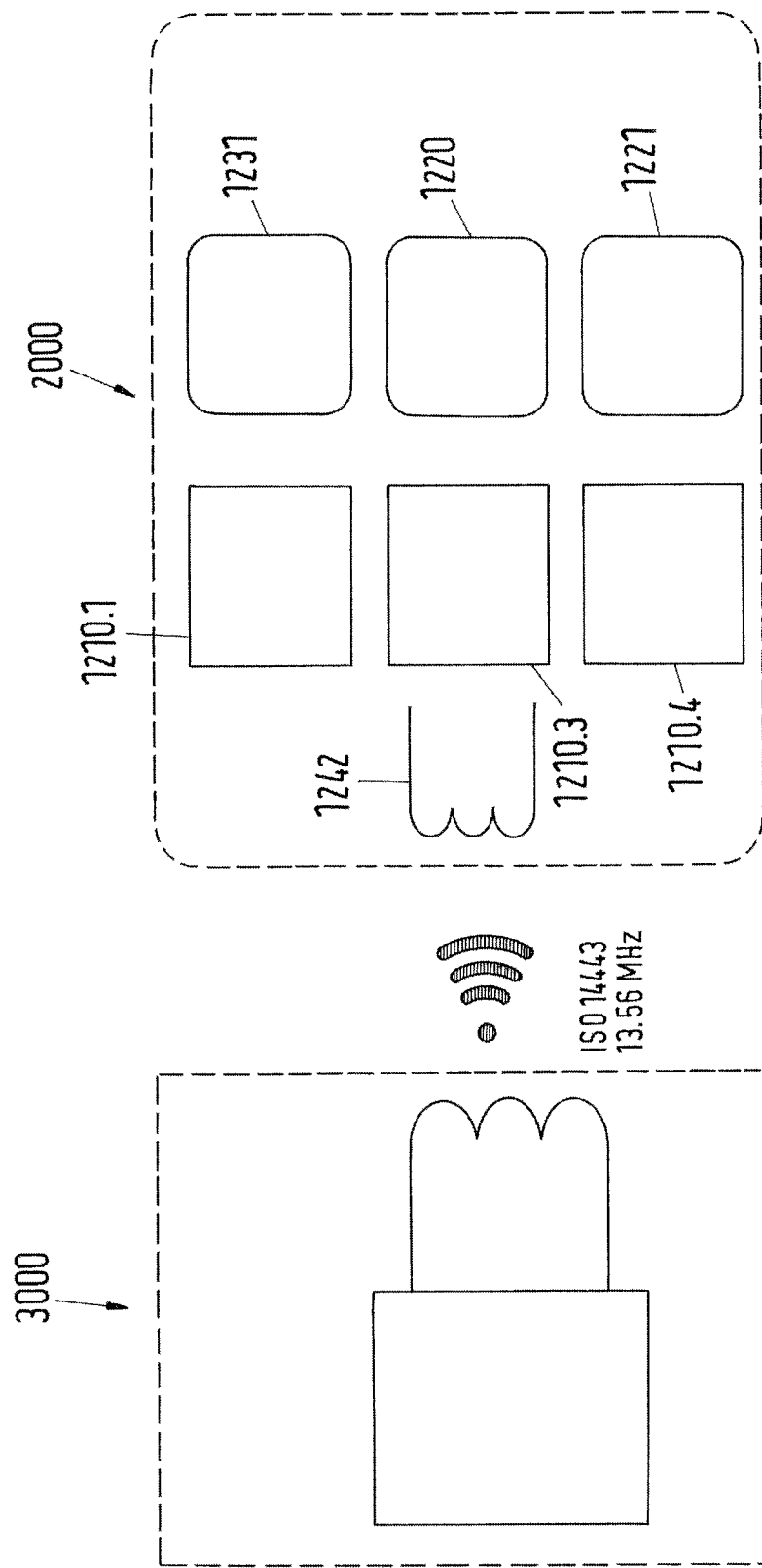
FIG. 9 shows a block diagram with the electronic components of a multifunctional value or security document and with a reading/writing device.

The electronic components 1210 contained in an ID card 2000 are shown in FIG. 9: The electric circuit 1270 of the card comprises a central processor 1210.1, a power management processor 1210.3, a crypto-processor 1210.4, an input device, for example a PIN pad 1221, and a biometric sensor 1220, such as a fingerprint sensor, and an output device, for example a personalisation display 1231. The RFID circuit 1240 is formed on the one hand by a central processor and on the other hand by the RFID antenna 1242.

For a reading/writing process, the blank 1000 or the ID card 2000 is brought into the vicinity of a reading/writing device 3000, so that contactless communication in accordance with ISO 14443 as valid on the priority date of the present application can take place between this device and the ID card (transmission for example at a frequency of 13.56 MHz).

The following approach is adopted in order to produce the ID card (FIG. 10):

Firstly, electric circuits 1270 are produced on a multiple-up layout of circuit carrier layers 1200 (not shown in the figures) (method step (A)). To this end, at least one prepreg is processed in a lamination device to form a laminate in that the at least one prepreg is cured together with copper foils (on one side or both sides) with planar application of pressure and with introduction of heat. Conductor tracks 1240, 1250 are produced thereon using printed circuit board technology. If wiring is to be produced on both sides, through-holes must firstly be formed in the laminate, and these holes must be metallised. To this end, the methods conventional in printed circuit board technology likewise can be applied. If the circuit carrier layers are to be present in the form of multi-layer circuits, a plurality of layers of this kind with prepregs arranged there between and external copper foils, which are brought into contact face-to-face with the existing laminate by a further prepregs, must be laminated and the resultant laminate in turn subjected to a lamination method. The conditions of the above-mentioned lamination method are dependent on the type of resin and are generally known in the field of printed circuit board technology.

The circuit carrier layers 1200 produced in this way in multiple-up layout with wiring 1240, 1250 thereon and as appropriate in inner levels are then equipped with electronic components 1210 (method step (B)). To this end, conventional mounting methods are applied, preferably soldering methods, and as appropriate also bonding methods. The components can be mounted housed or unhoused. They are preferably unhoused.

Figure 10:
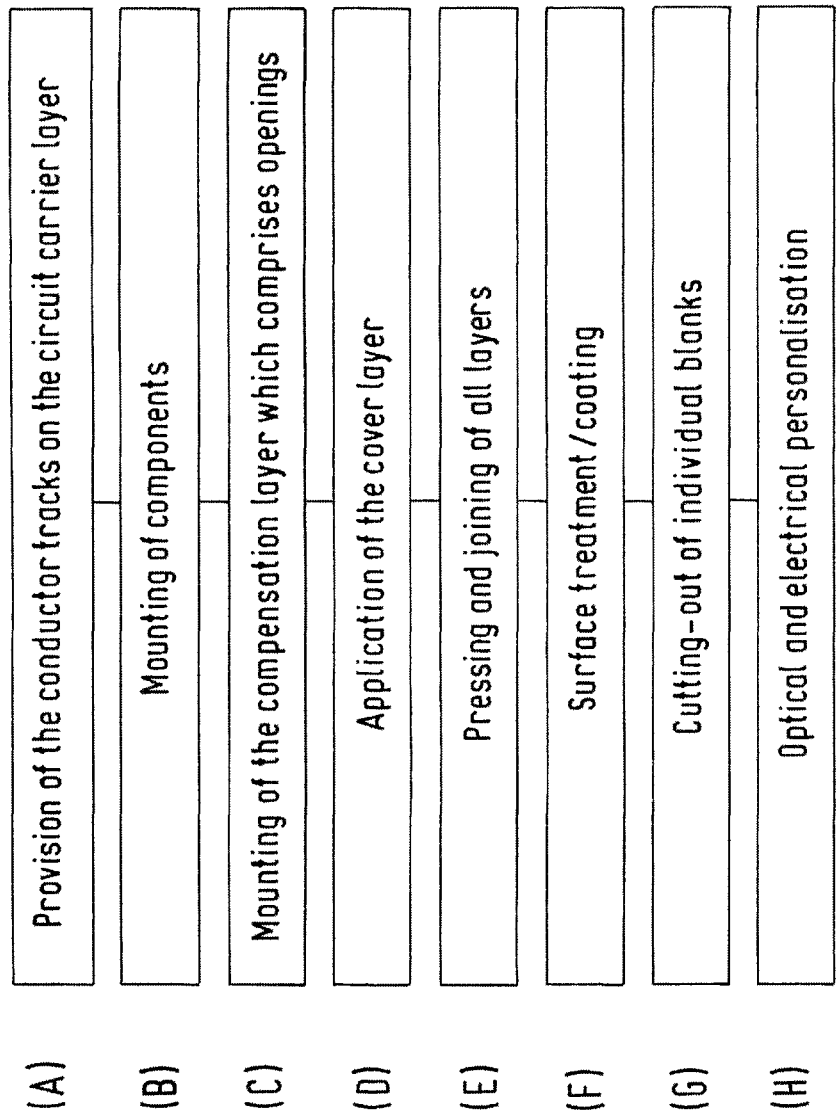
FIG. 10 shows a flow diagram of the method according to the invention.

In the case of unhoused components, the circuit layers with components and compensation layers can firstly be stacked one above the other and compressed together, in contrast to that shown in FIG. 10, and then the conductor tracks can be created by laser drilling of blind holes to the component connections and galvanisation and structuring of electric connections between the components.

At least one multiple-up layout of compensation layers 1100 is provided and brought together with the multiple-up layout of the circuit layers to form a stack (method step (C)), which is formed from a prepreg with electric circuits 1270 formed thereon. To this end, openings 1120 and/or recesses, at the locations at which the electronic components 1210 are disposed on the circuit carrier layers 1200, are formed in the compensation layers, for example by punching, milling or by means of a laser removal method. If electronic components are disposed only on one side of the multiple-up layout of the circuit carrier layer, only one multiple-up layout of the compensation layers must be arranged on this side. If, by contrast, components are disposed on both sides of the multiple-up layout of the circuit carrier layers, multiple-up layouts of compensation layers must be arranged on both sides.

Furthermore, at least one multiple-up layout of cover layers 1300 must be provided and brought together with the stack already formed from circuit layers and compensation layers 1100 (method step (D)), which is likewise formed from a prepreg. The cover layers likewise comprise openings 1320 where electronic components 1210 are disposed on the multiple-up layout of the circuit carrier layers, provided these electronic components are to be exposed outwardly, for example for a sensor, such as a fingerprint sensor device, or for a camera.

The at least one multiple-up layout of the compensation layers 1100 is arranged on the side(s) of the multiple-up layout of the circuit layers at which electronic components 1210 are disposed. A multiple-up layout of cover layers 1300 is also arranged in each case on the side of the multiple-up layout of the compensation layers facing away from the multiple-up layout of the circuit layers, such that the multiple-up layouts of the cover layers bear face-to-face and directly in contact against the multiple-up layouts of the compensation layers and the multiple-up layouts of the compensation layers bear face-to-face and directly in contact against the multiple-up layouts of the circuit layers.

As appropriate, multiple-up layouts of termination layers 1400 and—if desired—multiple-up layouts of further card layers are also provided, which are likewise formed from prepregs and which are placed on the at least one multiple-up layout stack 1700 of the card layers, so that they bear against this face-to-face and directly in contact (not taken into consideration in FIG. 10).

The formed multiple-up layout stack 1700 is then laminated in a lamination installation (method step (E)), in that pressure is applied in a planar manner to the stack and heat is fed thereto. A multiple-up layout of blanks 1000 of the ID card 2000 is thus produced.

The outer sides of the multiple-up layouts can then be refined in that the outer sides thereof are planarised, for example by means of a polishing method (method step (F)).

Furthermore, protective coating layers can be applied to the outer sides of the blanks 1000 (method step (F)), for example a coating that cures under UV or heat. This coating can be applied by means of a screen printing method, thermal transfer printing method or by means of other application techniques, such as roller coating or curtain coating or spraying or dipping. Instead of this protective coating layer or additionally thereto, a laser-sensitive layer, typically formed of polycarbonate, can also be applied so as to be able to provide a laser individualisation of the blanks.

The outer sides refined in this way can then be provided with a decorative print (method step (F)).

Furthermore, the surface treatment or coating serves to facilitate the subsequent optical personalisation. The coating of fibre composite materials is generally complex. The coating serves preferably as an adhesion promoter between the fibre composite surface and the subsequent print layer of the re-transfer printer. Adhesion promoters, in particular plastic primers, silanes or TPU are suitable materials. Alternatively, a thin film can also be placed in the stack prior to the compression.

The individual blanks are separated from the multiple-up layout of the blanks 1000 produced in this way, for example are separated by punching, milling or by means of a laser removal method (method step (G)). In addition, (slot) holes for a lanyard can be cut out by means of the aforesaid method types during this processing step.

The above explanations relate equally to the production and connection of individual repeats of the respective document layers.

Once the blanks 1000 have been separated, they are further processed to produce the individualised ID cards 2000 (method step (H)). To this end, an individualising print (for example by means of inkjet printing or thermal transfer printing) can be applied on the one hand. Instead of a printing method or additionally thereto, a laser individualising method can also be applied, in which the individualisation data is inscribed in a laser-sensitive layer in the blank using a laser. On the other hand, individualising data can also be read into the electronic memory (for example RFID chip 1241) of the electric circuit 1270 and stored there. If the blank has a display device 1230 with permanent display, individualising data can be permanently displayed on the display element (personalising display) 1231 of this device.

LIST OF REFERENCE SIGNS

1000 blank of a value or security document, of an ID card
1010 upper visible side
1020 lower visible side
1100 compensation layer, second document/card layer
1110 slot
1120 opening in the compensation layer
1130 cavity
1200 circuit carrier layer, first document/card layer
1210 electronic (semiconductor) component
1210.1 central processor
1210.2 display light source, LED
1210.3 power management processor
1210.4 crypto-processor
1220 (biometric) sensor (device), fingerprint scanning device, vein scanning device
1221 capacitive PIN pad
1230 display device
1231 display element (personalisation) display
1240 RFID circuit
1241 RFID-IC (chip)
1242 RFID antenna
1250 wiring pattern, conductor tracks
1270 electric circuit
1300 cover layer, third document/card layer
1310 print
1320 opening in the cover layer
1400 termination layer, document/card layer
1410 print on the termination layer
1700 (document layer/multiple-up layout) stack
2000 value or security document, ID card
3000 reading/writing device

The invention claimed is:

1. A value or security document (2000) comprising an electric circuit (1270), wherein the value or security document (2000) is formed of at least three document layers which are arranged in a document layer stack (1700) and which are connected together face-to-face by a joining method, wherein a first document layer is formed by a circuit carrier layer (1200) which supports the electric circuit (1270), at least one second document layer is formed in each case by a compensation layer (1100) which has at least one opening (1120) and/or recess, and at least one third document layer is formed in each case by a cover layer (1300), characterised in that the first (1200) and the at least one second (1100) and the at least one third document layer (1300) are formed from a fibre composite material which is formed by a thermoset based on epoxy resin and reinforced with glass fibre fabric, wherein the device includes a sensor device (1220) on the circuit carrier layer (1200), and wherein the at least one cover layer (1300) has an opening (1320), and wherein said sensor device (1220) is exposed outwardly.

2. The value or security document (2000) according to claim 1, characterised in that the fibre composite material does not melt.

3. The value or security document (2000) according to claim 2, characterised in that no boundaries are visible between the respective document layers (1100, 1200, 1300) in the value or security document (2000).

4. The value or security document (2000) according to claim 2, characterised in that the at least one cover layer (1300) and the circuit carrier layer (1200) are transparent or translucent.

5. The value or security document (2000) according to claim 2, characterised in that the value or security document (2000) comprises a display device (1230) with an electrophoretic, ferroelectric or cholesteric display element (1231), which permanently displays the individualising data.

6. The value or security document (2000) according to claim 1, characterised in that no boundaries are visible between the respective document layers (1100, 1200, 1300) in the value or security document (2000).

7. The value or security document (2000) according to claim 6, characterised in that the at least one cover layer (1300) and the circuit carrier layer (1200) are transparent or translucent.

8. The value or security document (2000) according to claim 6, characterised in that cavities (1130) that are formed by the at least one opening (1120) and/or recess in the at least one compensation layer (1100) and by electronic components (1210) mounted on the circuit carrier layer (1200), which electronic components protrude into the at least one opening (1120) or recess, are filled with a polymer material.

9. The value or security document (2000) according to claim 6, wherein said sensor device comprises a biometric sensor device (1220), and characterised in that the electric circuit (1270) comprises an RFID circuit, the biometric sensor device (1220) and/or an electronic display device (1230).

10. The value or security document (2000) according to claim 6, characterised in that the value or security document (2000) comprises a display device (1230) with an electrophoretic, ferroelectric or cholesteric display element (1231), which permanently displays the individualising data.

11. The value or security document (2000) according to claim 1, characterised in that the at least one cover layer (1300) and the circuit carrier layer (1200) are transparent or translucent.

12. The value or security document (2000) according to claim 11, characterised in that cavities (1130) that are formed by the at least one opening (1120) and/or recess in the at least one compensation layer (1100) and by electronic components (1210) mounted on the circuit carrier layer (1200), which electronic components protrude into the at least one opening (1120) or recess, are filled with a polymer material.

13. The value or security document (2000) according to claim 1, characterised in that cavities (1130) that are formed by the at least one opening (1120) and/or recess in the at least one compensation layer (1100) and by electronic components (1210) mounted on the circuit carrier layer (1200), which electronic components protrude into the at least one opening (1120) or recess, are filled with a polymer material.

14. The value or security document (2000) according to claim 13, wherein said sensor device comprises a biometric sensor device (1220), and characterised in that the electric circuit (1270) comprises an RFID circuit, the biometric sensor device (1220) and/or an electronic display device (1230).

15. The value or security document (2000) according to claim 13, characterised in that the value or security document (2000) comprises a display device (1230) with an electrophoretic, ferroelectric or cholesteric display element (1231), which permanently displays the individualising data.

16. The value or security document (2000) according to claim 1, wherein said sensor device comprises a biometric sensor device (1220), and characterised in that the electric circuit (1270) comprises an RFID circuit, the biometric sensor device (1220) and/or an electronic display device (1230).

17. The value or security document (2000) according to claim 1, characterised in that the value or security document (2000) comprises a display device (1230) with an electrophoretic, ferroelectric or cholesteric display element (1231), which permanently displays the individualising data.

18. The value or security document (2000) according to claim 1, characterised in that the sensor comprises a biometric sensor.

19. The value or security document (2000) according to claim 1, wherein said glass fibre fabric comprises a glass-fabric mat.

20. A method for producing a value or security document (2000) containing an electric circuit (1270), said method comprising the following method steps:
(a) providing a first document layer in the form of a circuit carrier layer (1200) which supports the electric circuit (1270), at least one second document layer in each case in the form of a compensation layer (1100), which has at least one opening (1120) and/or recess, and at least one third document layer in each case in the form of a cover layer (1300);
(b) stacking the first (1200) and the at least one second (1100) and the at least one third document layer (1300) to form a document layer stack (1700);
(c) joining the first (1200) and the at least one second (1100) and the at least one third document layer (1300) non-detachably, in particular by means of a lamination method, wherein a document blank (1000) is produced; and
(d) individualising the document blank (1000), wherein the value or security document (2000) is created,
wherein the first (1200) and the at least one second (1100) and the at least one third document layer (1300) are formed from a fibre composite material which is formed by a thermoset based on epoxy resin and reinforced with glass fibre fabric;
wherein the at least one cover layer (1300) is provided with an opening (1320); and
wherein joining the first (1200) and the at least one second (1100) and the at least one third document layer (1300) non-detachably to produce a document blank (1000) exposes a sensor device (1220) outwardly disposed on the circuit carrier layer (1200).

21. The method for producing a value or security document (2000) containing an electric circuit (1270) according to claim 20, wherein said glass fibre fabric comprises a glass-fabric mat, wherein said glass-fabric mat is cured together with said thermoset based epoxy resin material, and wherein said glass-fabric mat is saturated with said thermoset based epoxy resin prior to curing.

* * * * *